(12) United States Patent
Noris et al.

(10) Patent No.: US 11,113,891 B2
(45) Date of Patent: Sep. 7, 2021

(54) SYSTEMS, METHODS, AND MEDIA FOR DISPLAYING REAL-TIME VISUALIZATION OF PHYSICAL ENVIRONMENT IN ARTIFICIAL REALITY

(71) Applicant: Facebook Technologies, LLC, Menlo Park, CA (US)

(72) Inventors: Gioacchino Noris, Zurich (CH); Jeng-Weei Lin, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/773,770

(22) Filed: Jan. 27, 2020

(65) Prior Publication Data

US 2021/0233312 A1 Jul. 29, 2021

(51) Int. Cl.
 *G06T 19/20* (2011.01)
 *G06T 19/00* (2011.01)
(52) U.S. Cl.
 CPC ............ *G06T 19/006* (2013.01); *G06T 19/20* (2013.01); *G06T 2219/2012* (2013.01)
(58) Field of Classification Search
 CPC .............................. G06T 19/006; G06T 19/20
 USPC ........................................................ 345/419
 See application file for complete search history.

(56) References Cited

U.S. PATENT DOCUMENTS

| | | | |
|---|---|---|---|
| 10,124,257 B2 | 11/2018 | Stafford | |
| 2003/0034974 A1 | 2/2003 | Welch | |
| 2012/0092328 A1 | 4/2012 | Flaks | |
| 2013/0005467 A1 | 1/2013 | Kim | |
| 2013/0093788 A1 | 4/2013 | Liu | |
| 2015/0235610 A1 | 8/2015 | Miller | |
| 2017/0287215 A1 | 10/2017 | LaLonde | |

(Continued)

FOREIGN PATENT DOCUMENTS

| | | | |
|---|---|---|---|
| EP | 2660643 A2 | 11/2013 | |
| EP | 3163407 A1 | 5/2017 | |
| GB | 2376397 A | 12/2002 | |

OTHER PUBLICATIONS

International Search Report and Written Opinion for International Application No. PCT/US2020/067020, dated Apr. 19, 2021.

(Continued)

*Primary Examiner* — Thomas J Lett
(74) *Attorney, Agent, or Firm* — Baker Botts L.L.P.

(57) ABSTRACT

Particular embodiments are directed to a passthrough feature. A computing system may display a virtual-reality scene on a device worn by a user. The system may receive a request to display a visual representation of at least a portion of a physical environment surrounding the user. The system may access data associated with the physical environment captured by camera(s) of the device. The system may generate, based the data, depth measurements of one or more objects in the physical environment. The system may generate, based on the depth measurements, one or more models of the one or more objects in the physical environment. The system may render an image based on a viewpoint of the user and the one or more models and, based on the image, generate the visual representation requested by the user. The visual representation may then be displayed with the virtual-reality scene to the user.

20 Claims, 9 Drawing Sheets
(2 of 9 Drawing Sheet(s) Filed in Color)

(56) References Cited

U.S. PATENT DOCUMENTS

| | | |
|---|---|---|
| 2017/0365100 A1 | 12/2017 | Walton |
| 2018/0067316 A1 | 3/2018 | Lee |
| 2018/0068488 A1 | 3/2018 | Hart |
| 2018/0088323 A1* | 3/2018 | Bao .................... G02B 27/0093 |
| 2018/0232056 A1 | 8/2018 | Nigam |
| 2019/0101758 A1* | 4/2019 | Zhu .......................... G06T 3/00 |
| 2019/0197765 A1 | 6/2019 | Molyneaux |
| 2019/0220002 A1 | 7/2019 | Huang |
| 2019/0243448 A1 | 8/2019 | Miller |
| 2020/0020166 A1 | 1/2020 | Menard |
| 2020/0026922 A1 | 1/2020 | Pekelny |
| 2020/0334908 A1* | 10/2020 | Wilson .................. G06T 19/006 |

OTHER PUBLICATIONS

International Search Report and Written Opinion for International Application No. PCT/US2020/067055, dated Apr. 21, 2021.

* cited by examiner

SYSTEMS, METHODS, AND MEDIA FOR DISPLAYING REAL-TIME VISUALIZATION OF PHYSICAL ENVIRONMENT IN ARTIFICIAL REALITY

TECHNICAL FIELD

This disclosure generally relates to computer graphics and 3D reconstruction techniques.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in artificial reality and/or used in (e.g., perform activities in) an artificial reality.

Artificial reality systems that provide artificial reality content may be implemented on various platforms, including a head-mounted device (HMD) connected to a host computer system, a standalone HMD, a mobile device or computing system, or any other hardware platform capable of providing artificial reality content to one or more viewers. When a user is wearing an HMD, his vision of the physical environment is occluded by the physical structure of the HMD. For example, the displays of the HMD could be positioned directly in front of and in close proximity to the user's eyes. Thus, whenever the user needs to see his physical surroundings, he would need to remove the HMD. Even if the removal of the HMD is temporary, doing so is inconvenient and disruptive to the user experience.

SUMMARY OF PARTICULAR EMBODIMENTS

Embodiments described herein enable a user immersed in artificial reality to cause a visual representation of the physical world ("passthrough") to be displayed on-demand. For example, when the user wishes to see the physical world, he could issue a command (e.g., via a button, gesture, voice, etc.) to invoke the passthrough feature. In response, the artificial-reality system may generate a real-time representation of the physical world and superimpose it over the artificial reality. In particular embodiments, the passthrough representation may be an outline of the edges of the physical world. The outline may be generated by taking a gradient of the images captured by the HMD's external-facing cameras, and the high-gradient features may be realigned to match the viewpoints of the user's eyes.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Artificial reality—especially virtual reality—is designed to provide users with an immersed experience separate from the real world. The immersive experience is attributable in part to the HMD providing simulated content and shielding the real world from the user's vision. However, while a user is immersed in artificial reality, there may be many moments when the user may want to see the real world. For example, the user may want to speak briefly to someone in the physical world, look for his mobile device, pick up a coffee mug, or see what attributed to a noise he heard. To do so, users of traditional HMD systems would need to at least temporarily remove the HMD. For systems that have controllers, the user may further need to put down at least one of the controllers in order to free up a hand to remove the HMD. These actions could significantly disrupt the user's immersive artificial-reality experience.

Particular embodiments described herein provide a user who is immersed in artificial reality the ability and option to quickly perceive his physical surroundings without having to remove the HMD. "Passthrough" is a feature that allows a user to see his physical surroundings while wearing an HMD. Information about the user's physical environment is visually "passed through" to the user by having the HMD display information captured by the headset's external-facing cameras. Simply displaying the captured images would not work as intended, however. Since the locations of the cameras do not coincide with the locations of the user's eyes, the images captured by the cameras do not accurately reflect the user's perspective. In addition, since the images have no depth, simply displaying the images would not provide the user with proper parallax effects if he were to shift away from where the images were taken. Thus, rather than simply displaying the captured images, the passthrough feature extracts information about the environment from the captured images (e.g., depth information), use the information to generate a 3D model of the environment, and reconstruct a scene of the modeled environment from the user's current viewpoint.

Figure 1:
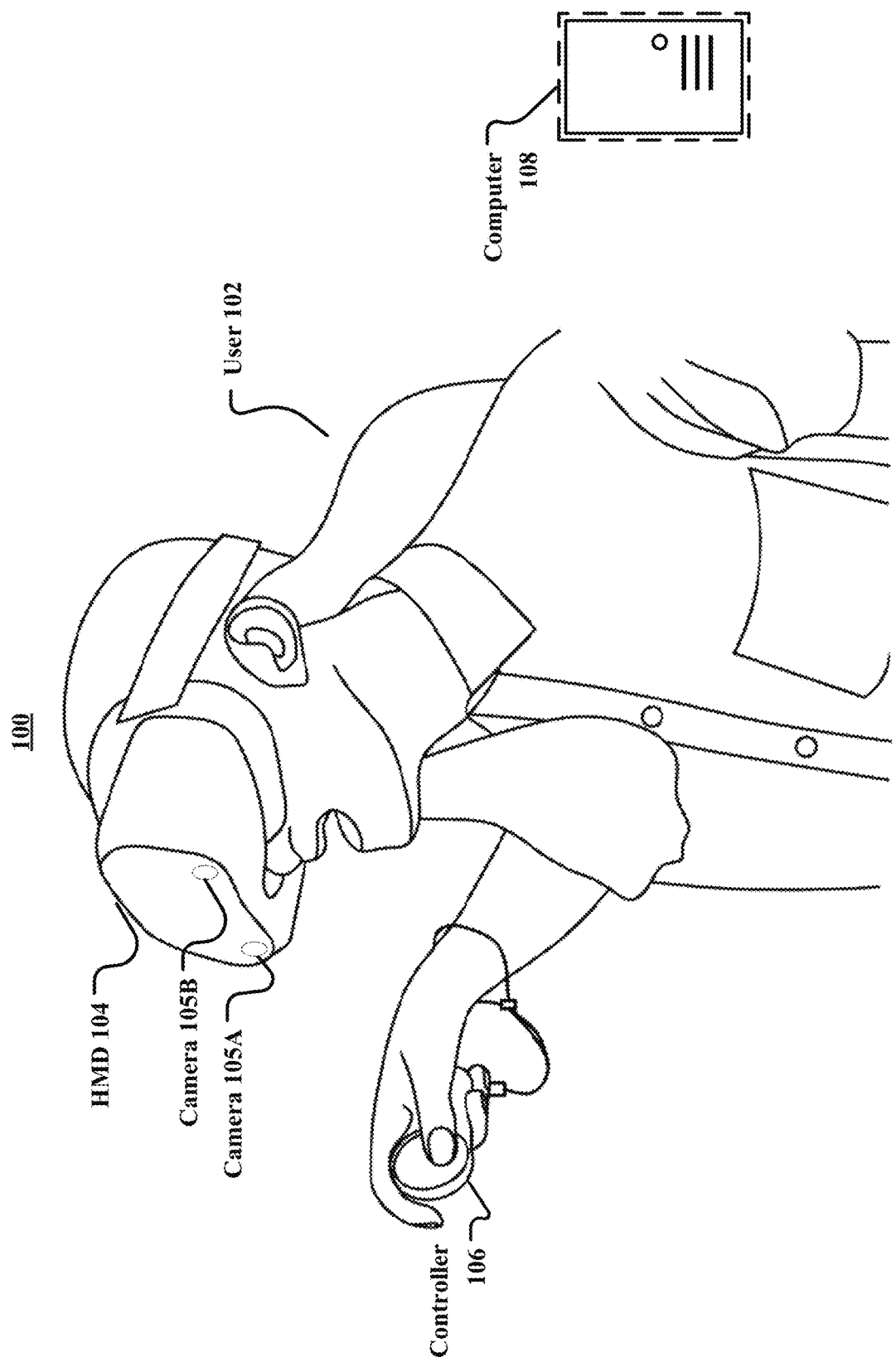
FIG. 1 illustrates an example artificial reality system worn by a user, in accordance with particular embodiments.

FIG. 1 illustrates an example of an artificial reality system 100 worn by a user 102. In particular embodiments, the artificial reality system 100 may comprise a head-mounted device ("HMD") 104, a controller 106, and a computing system 108. The HMD 104 may be worn over the user's eyes and provide visual content to the user 102 through internal displays (not shown). The HMD 104 may have two separate internal displays, one for each eye of the user 102. As illustrated in FIG. 1, the HMD 104 may completely cover the user's field of view. By being the exclusive provider of visual information to the user 102, the HMD 104 achieves the goal of providing an immersive artificial-reality experience. One consequence of this, however, is that the user 102 would not be able to see the physical environment surrounding him, as his vision is shielded by the HMD 104. As such, the passthrough feature described herein is needed to provide the user with real-time visual information about his physical surroundings.

The HMD 104 may have external-facing cameras, such as the two forward-facing cameras 105A and 105B shown in FIG. 1. While only two forward-facing cameras 105A-B are shown, the HMD 104 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video). As previously explained, although images captured by the forward-facing cameras 105A-B may be directly displayed to the user 102 via the HMD 104, doing so would not provide the user with an accurate view of the physical environment since the cameras 105A-B cannot physically be located at the exact same location as the user's eyes. As such, the passthrough feature described herein uses a re-projection technique that generates a 3D representation of the physical environment and then renders images based on the 3D representation from the viewpoints of the user's eyes.

The 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel $p_A$ in the image captured by camera 105A, and the same feature may appear at another pixel $p_B$ in the image captured by camera 105B. As long as the depth measurement system knows that the two pixels correspond to the same feature, it could use triangulation techniques to compute the depth of the observed feature. For example, based on the camera 105A's position within a 3D space and the pixel location of $p_A$ relative to the camera 105A's field of view, a line could be projected from the camera 105A and through the pixel $p_A$. A similar line could be projected from the other camera 105B and through the pixel $p_B$. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., position and orientation) of the HMD 104 within the environment may be needed. For example, in order to render the appropriate display for the user 102 while he is moving about in a virtual environment, the system 100 would need to determine his position and orientation at any moment. Based on the pose of the HMD, the system 100 may further determine the viewpoint of either of the cameras 105A and 105B or either of the user's eyes. In particular embodiments, the HMD 104 may be equipped with inertial-measurement units ("IMU"). The data generated by the IMU, along with the stereo imagery captured by the external-facing cameras 105A-B, allow the system 100 to compute the pose of the HMD 104 using, for example, SLAM (simultaneous localization and mapping) or other suitable techniques.

In particular embodiments, the artificial reality system 100 may further have one or more controllers 106 that enable the user 102 to provide inputs. The controller 106 may communicate with the HMD 104 or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller. For example, the controller 106 may have several infrared LEDs or other known observable features that collectively form a predetermined pattern. Using a sensor or camera, the system 100 may be able to capture an image of the predetermined pattern on the controller. Based on the observed orientation of those patterns, the system may compute the controller's position and orientation relative to the sensor or camera.

The artificial reality system 100 may further include a computer unit 108. The computer unit may be a stand-alone unit that is physically separate from the HMD 104 or it may be integrated with the HMD 104. In embodiments where the computer 108 is a separate unit, it may be communicatively coupled to the HMD 104 via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

Figure 2:
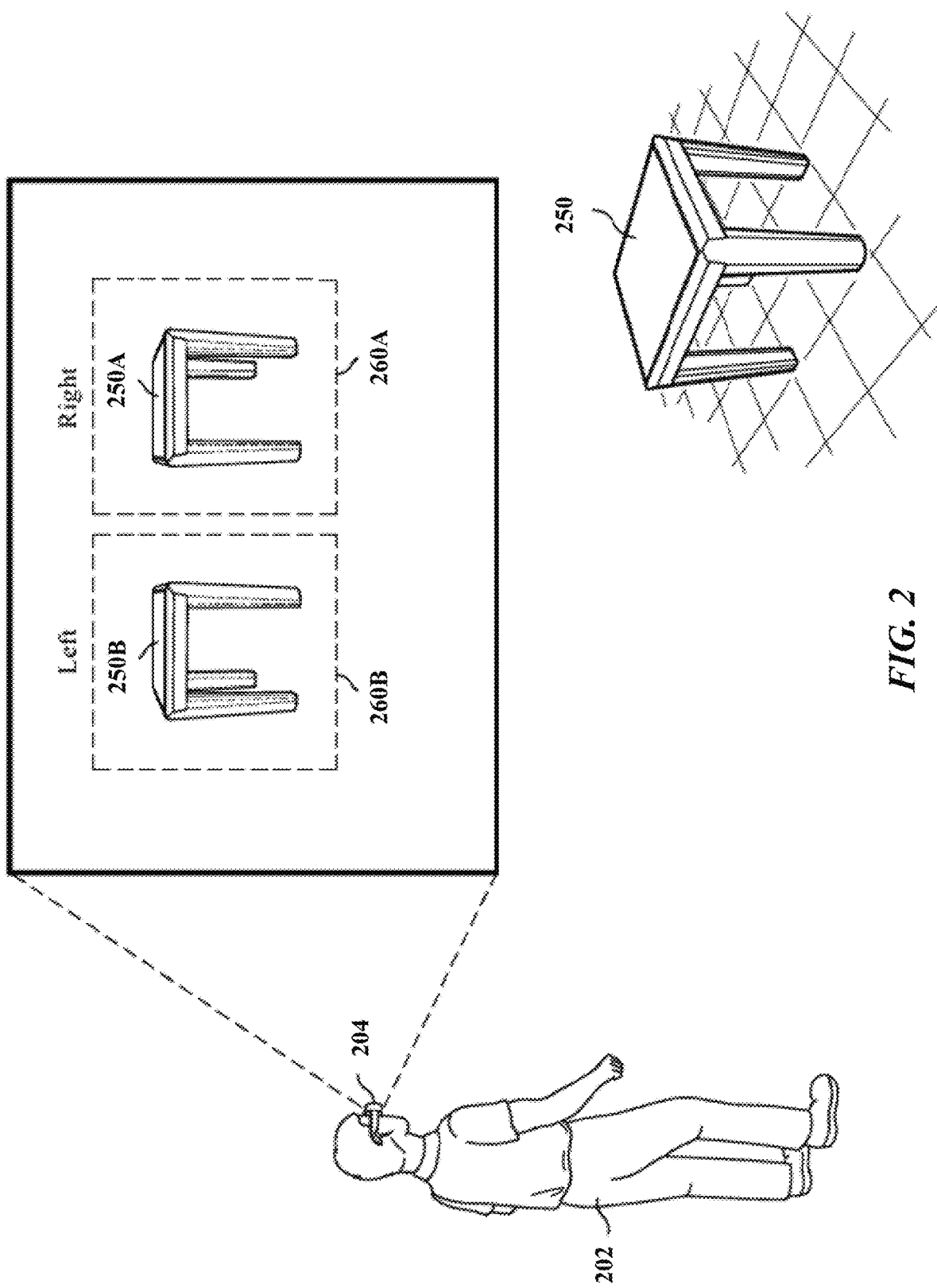
FIG. 2 illustrates an example of a passthrough feature, in accordance with particular embodiments.

FIG. 2 illustrates an example of the passthrough feature. A user 202 may be wearing an HMD 204, immersed within a virtual reality environment. A physical table 250 is in the physical environment surrounding the user 202. However, due to the HMD 204 blocking the vision of the user 202, the user 202 is unable to directly see the table 250. To help the user perceive his physical surroundings while wearing the HMD 204, the passthrough feature captures information about the physical environment using, for example, external-facing cameras of the HMD 204. The captured information may then be re-projected to the user 202 based on his viewpoints. In particular embodiments where the HMD 204 has a right display 260A for the user's right eye and a left display 260B for the user's left eye, the system 200 may individually render (1) a re-projected view 250A of the physical environment for the right display 260A based on a viewpoint of the user's right eye and (2) a re-projected view 250B of the physical environment for the left display 260B based on a viewpoint of the user's left eye.

Figure 3A:
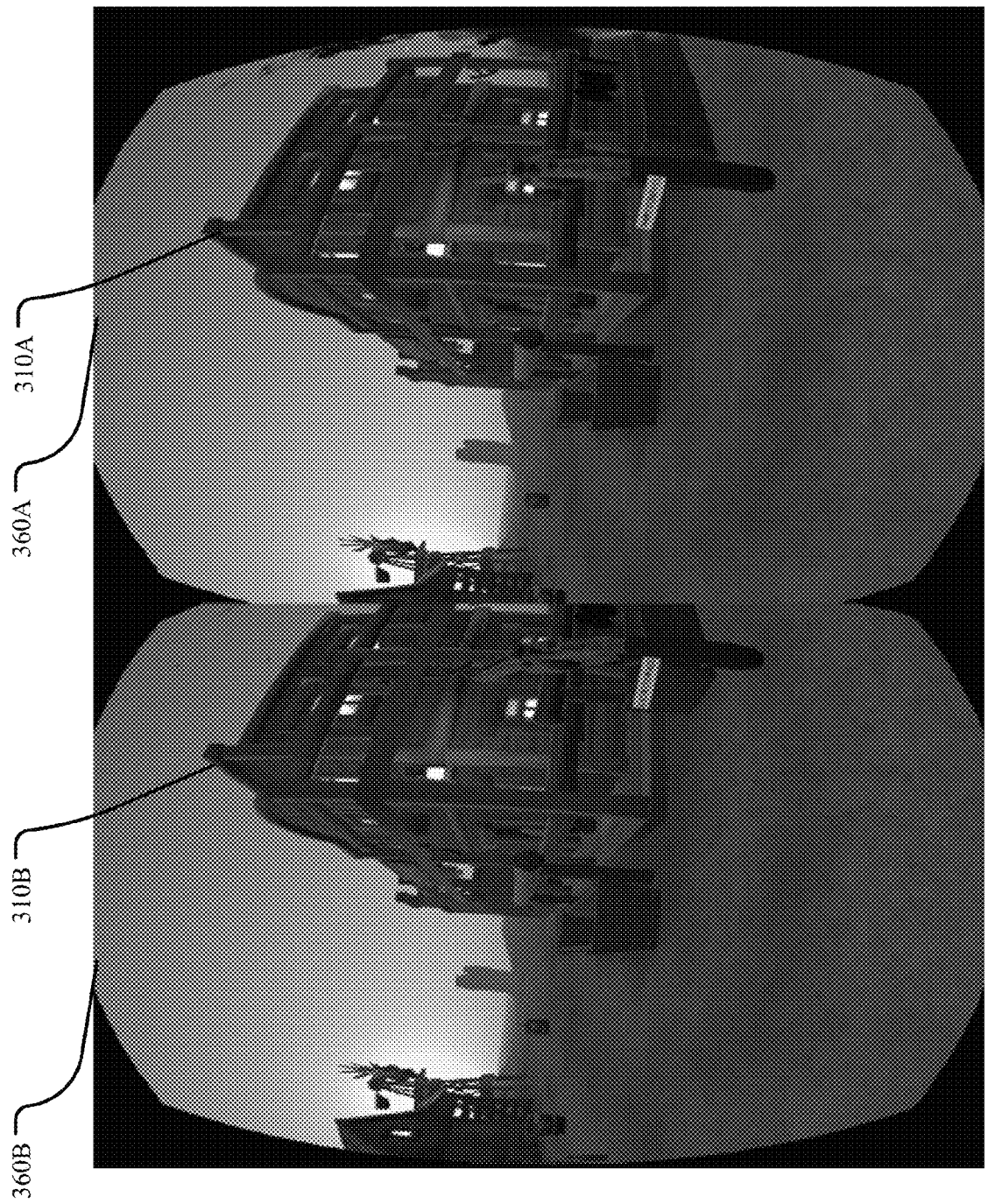
FIGS. 3A and 3B illustrate examples of the passthrough feature as seen by a user, in accordance with particular embodiments.
Figure 3B:
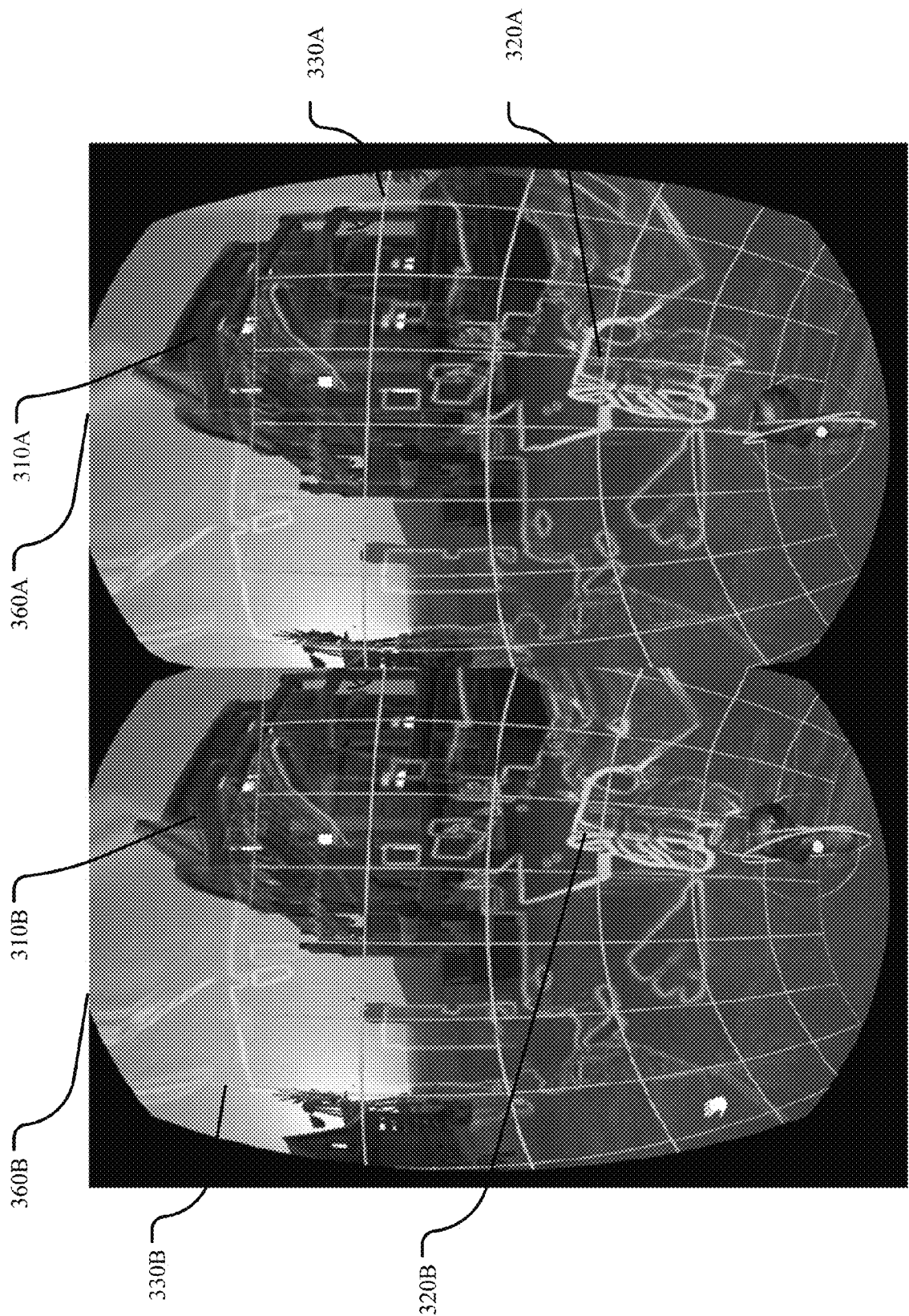

FIGS. 3A and 3B illustrate examples of the passthrough feature as seen by a user, in accordance with particular embodiments. FIG. 3A illustrates the virtual content that may be presented to a user who may be immersed in virtual reality. A computing system may render and display a right-eye image 360A and a left-eye image 360B. The rendered virtual content may be predefined by its developer and not based on any visible object within the user's physical surroundings. For example, FIG. 3A shows a rendered right-eye view 310A and a rendered left-eye view 310B of the same virtual house. The rendered images of the virtual house may be generated based on a 3D model defined by a content developer. For example, the virtual house may be part of a game or a virtual world designed for social interaction between a network of virtual-reality users.

While immersed in virtual reality, the user may desire to see the physical environment around him. For example, the user may want to see who has entered the room, who is speaking to him, where the coffee mug is, what obstacles or hazards are in his play space, etc. In conventional systems, the user would need to remove the HMD to see the physical environment. However, doing so, even if temporarily, is disruptive to the immersive virtual-reality experience.

In particular embodiments, the computing system associated with the user's HMD may provide an on-demand passthrough feature. When the user wishes to see information about his physical surroundings, he may issue a command to cause the computing system to display passthrough information. For example, the user may trigger the feature by pressing a button on a controller, providing a particular voice command, or making a particular gesture. In particular embodiments, the passthrough feature may be provided by the operating system of the artificial-reality device so that the feature could be invoked within any third-party application running on the operating system. This allows the passthrough feature to be invoked while the user is playing a game, exploring a virtual world, or watching a movie with friends. The particular command for enabling the passthrough feature may be reserved by the operating system so that the command does not conflate with any other action designed by individual applications. For example, the command may require a particular pattern of buttons to be pressed simultaneously, a particular button to be pressed for a threshold amount of time (e.g., 1 second, 2 seconds, etc.), a voice command that includes a particular trigger word (e.g., "passthrough"), a particular gesture (e.g., rotating one hand twice within a threshold amount of time), or any combination of the above.

FIG. 3B illustrates an example of a passthrough visualization of the user's physical environment. One passthrough visualization 320A is rendered from the perspective of the user's right eye, and another passthrough visualization 320B is rendered from the perspective of the user's left eye. In this example, the passthrough visualizations 320A and 320B are superimposed over the virtual-reality scene 310A and 310B to minimize the disruption to the immersive virtual-reality experience. Since the passthrough visualizations 320A-B are being displayed concurrently with the virtual-reality content, the particular passthrough visualizations 320A-B shown in FIG. 3 include a gradient outline of the physical objects around the user rather than a fully reconstructed representation of the objects. Displaying only the outline minimizes the amount of occlusion to the virtual environment. How the outline is generated will be described in further detail below.

In addition to the passthrough visualization 320A-B, a safety boundary 330A-B may optionally be displayed. The safety boundary 330A-B defines an obstacle-free area in which the user could move freely while being immersed in virtual reality. In particular embodiments, when the user puts on the HMD, the virtual-reality system would ask the user to draw a safety boundary with the controller to define an area in the physical environment that is free of obstacles. When the user is within a threshold distance to the boundary or crosses it, the virtual-reality system may display a visualization of the safety boundary 330A-B to warn the user to be aware of obstacles outside of the boundary. As shown in FIG. 3B, it may be informative to further show passthrough information 320A-B with the visualization of the safety boundary 330A-B to help user avoid obstacles in the real world.

The passthrough feature provides a perspective-accurate visualization of the user's surroundings by re-projecting the visual data captured by the external-facing cameras into the screen space of each eye of the user. At a high-level, the process for generating a passthrough visualization has two phases: generating a 3D model of the physical environment and rendering a passthrough visualization based on the 3D model. Through the external-facing cameras 105A-B of the HMD 104, a sequence of images of the surrounding physical environment may be captured. The information captured by the cameras 105A-B, however, would be misaligned with what the user's eyes would see since the cameras could not spatially coincide with the user's eyes (e.g., the cameras and the user's eyes have different viewpoints because they are located some distance away from each other). As such, simply displaying what the cameras captured to the user would not be an accurate representation of what the user should perceive. Thus, instead of simply displaying what was captured, the passthrough feature would re-project information captured by the external-facing cameras 105A-B to the user.

Figure 4:
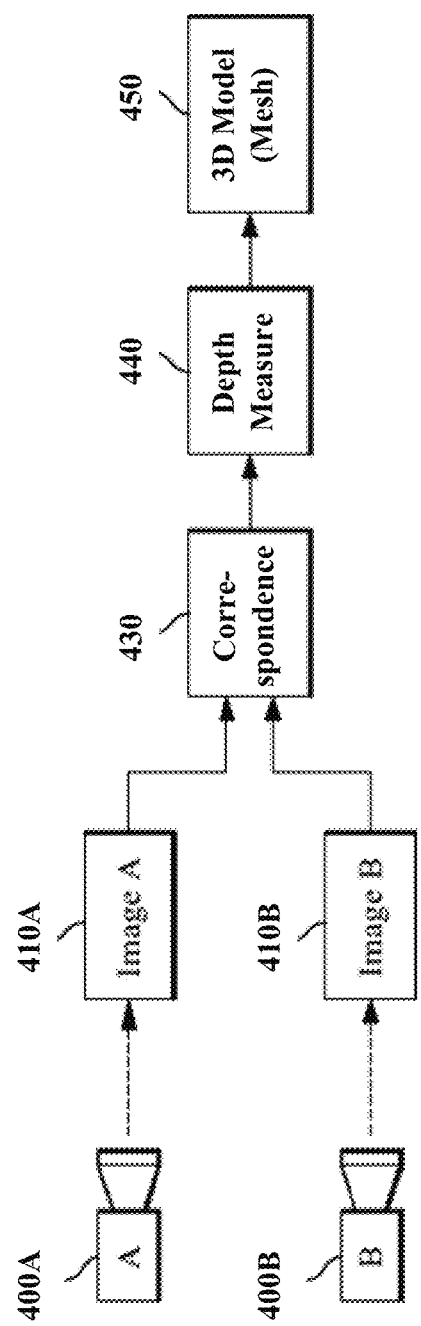
FIG. 4 illustrates an example process for modeling the physical environment surrounding the user, in accordance with particular embodiments.

FIG. 4 illustrates an example process for modeling the physical environment surrounding the user, in accordance with particular embodiments. Information about the physical environment may be captured using any suitable sensors. For example, FIG. 4 illustrates a pair of stereo cameras 400A and 400B that are a known distance apart and have a shared field of view. The stereo cameras 400A and 400B may simultaneously capture stereo images 410A and 410B, respectively. Each pair of simultaneously captured stereo images 410A-B may be used to estimate the depths of observed features. As explained above, to measure depth using triangulation, a computing unit would determine correspondences 430 between pixels of the stereo images 410A-B. For example, the computing unit would determine which two pixels in the pair of stereo images 410A-B correspond to the same observed feature. Based on the pixel correspondences 430, along with the known spatial relationship between the cameras 400A-B, the computing unit may use triangulation or other suitable techniques to estimate the depth 440 of the feature captured by the pixels. The depth measurements 440 of the observable features in the environment may then be used to construct a 3D model 450 to represent the physical environment.

A high-performance computing unit may solve the correspondence problem using a GPU and optical flow techniques, which are optimized for determining correspondences. The correspondence information may then be used to compute depths using triangulation techniques. Based on the computed depths of the observed features, the computing unit could determine where those features are located within a 3D space (since the computing unit also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. For example, the system may cast rays into the 3D space from a viewpoint that corresponds to each eye of the user. In this manner, the rendered scene that is displayed to the user would be computed from the perspective of the user's eyes, rather than from the perspective of the external-facing cameras.

The process described above, however, may not be feasible for a resource-limited computing device (e.g., a mobile phone may be the main computational unit for the HMD). For example, unlike systems with powerful computational resources and ample energy sources, a mobile phone may not be able to rely on GPUs and computationally-expensive algorithms (e.g., optical flow) to perform depth measurements and generate an accurate 3D model of the environment. Thus, to provide passthrough on resource-limited devices, an optimized process is needed.

Resource-limited devices, such as mobile phones, may leverage video encoders to determine correspondences, in accordance with particular embodiments. A video encoder (hardware or software) is designed to be used for video compression. It is common on any computing device capable of capturing and displaying video, even resource-limited ones like mobile phones. The video encoder achieves compression by leveraging the temporal consistency that is often present between sequential frames. For example, in a video sequence captured by a camera that is moving relative to an environment, the frame-by-frame difference would likely be fairly minimal. Most objects appearing in one frame would continue to appear in the next, with only slight offsets relative to the frame due to changes in the camera's perspective. Thus, instead of storing the full color values of all the pixels in every frame, the video encoder predicts where the pixels in one frame (e.g., a frame at time t, represented by $f_t$) came from in a previous frame (e.g., a frame at time t−1, represented by $f_{t-1}$), or vice versa. The encoded frame may be referred to as a motion vector. Each grid or cell in the motion vector corresponds to a pixel in the frame $f_t$ that the motion vector is representing. The value in each grid or cell stores a relative offset in pixel space that identifies the likely corresponding pixel location in the previous frame $f_{t-1}$. For example, if the pixel at coordinate (10, 10) in frame $f_t$ corresponds to the pixel at coordinate (7, 8) in the previous frame $f_{t-1}$, the motion vector for frame $f_t$ would have grid or cell at coordinate (10, 10) that specifies a relative offset of (−3, −2) that could be used to identify the pixel coordinate (7, 8).

In particular embodiments, the correspondences between two stereo images 410A-B may be computed using a device's video encoder. Using an API provided for the device's video encoder, the computing unit tasked with generating the passthrough feature may instruct the video encoder to process the two stereo images 410A and 410B. However, since video encoders are designed to find correspondence between sequential frames captured at a high frame rate (e.g., 30, 60, 80, or 100 frames-per-second), which means that sequential frames are likely very similar, having the video encoder find correspondences between two simultaneously captured stereo images 410A-210B may yield suboptimal results. Thus, in particular embodiments, one or both of the images 410A-B may undergo a translation based on the known physical separation between the two cameras 400A and 400B so that the images 410A and 410B would be more similar.

The output of the video encoder may be a motion vector that describes the predicted correspondences between images 410A and 410B using per-pixel offsets. The motion vector, however, could be noisy (i.e., many of the correspondences could be inaccurate). Thus, in particular embodiments, the motion vector may undergo one or more verification filters to identify the more reliable correspondence predictions. For example, one verification filter may use the known geometry of the cameras 400A and 400B to determine epipolar lines for each pixel. Using the epipolar line associated with each pixel, the computing device could determine whether the corresponding pixel as identified by the motion vector is a plausible candidate. For example, if the corresponding pixel falls on or within a threshold distance of the epipolar line, then the corresponding pixel may be deemed plausible. Otherwise, the corresponding pixel may be deemed implausible and the correspondence result would be rejected from being used in subsequent depth computations.

In particular embodiments, the verification filter may assess the reliability of a correspondence found by the motion vector based on temporal observations. This temporal filtering process may be applied to the original motion vector or only to a subset of the motion vector that survived the epipolar filtering process. For each correspondence undergoing the temporal filtering process, the system may compute the depth value using triangulation. The depth values may be represented as a point cloud in 3D space. The temporal filtering process may check whether the same points can be consistently observed through time. For example, the computing system may have a camera capture an image from a particular current perspective and compare it to a projection of the point cloud into a screen space associated with the current perspective. As an example, given the current perspective, the device may compute where, in screen space (e.g., the location of a particular pixel), the user should see each point in the point cloud. This may be done by projecting each point towards a point representation of the current perspective. As each point is being projected, it passes through a screen space of the current perspective. The location where the projected point intersects the screen space corresponds to a pixel location where that point is expected to appear. By comparing the projected pixel location to the same pixel location in the captured image, the system could determine whether the two pixels likely correspond to each other. If so, that point in the point cloud gets a positive vote; otherwise, it gets a negative vote. The points with a sufficiently high vote would be used as the final set of reliable points. After the verification filtering process, the system would have a collection of stereo outputs or depth measurements.

In particular embodiments, the computing device may be configured to dynamically determine, at runtime, whether it is capable of or able to generate depth measurements using (1) the GPU and optical flow or (2) the video encoder and motion vectors. For example, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths.

Figure 5:
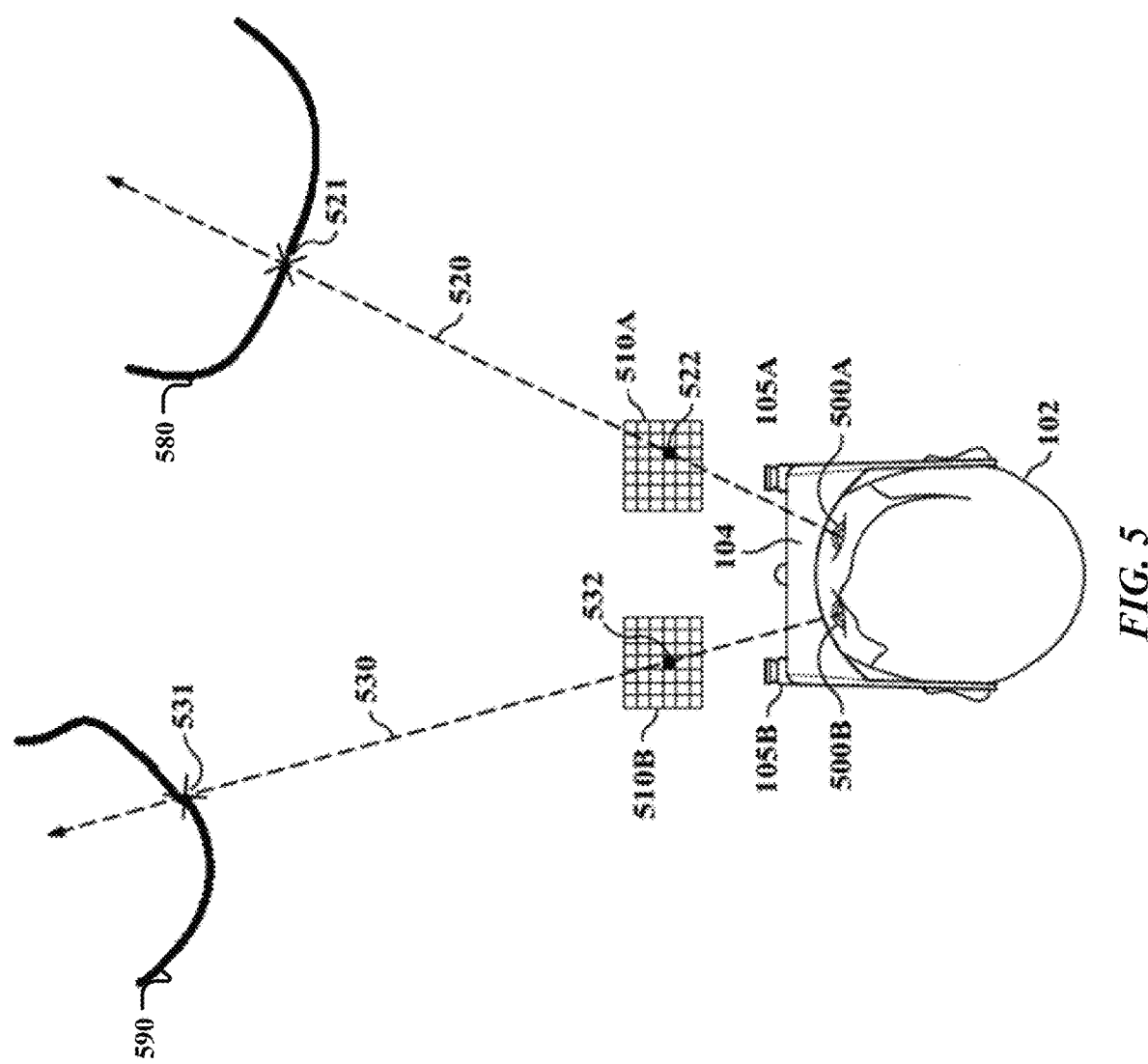
FIG. 5 provides an illustration of 3D-passthrough rendering based on a 3D model of the environment, in accordance with particular embodiments.

Once the computing device has generated a point cloud based on the depth measurements, it may generate a 3D mesh representation of the observed environment. For high-performance devices, accurate models of objects in the environment may be generated (e.g., each object, such as a table or a chair, may have its own 3D model). However, for resource-limited devices, the cost of generating such models and/or the underlying depth measurements for generating the models may be prohibitive. Thus, in particular embodiments, the 3D mesh representation for the environment may be a coarse approximation of the general contour of the objects in the environment. In particular embodiments, a single 3D mesh may be used to approximate all the objects observed. Conceptually, the 3D mesh is analogous to a blanket or sheet that covers the entire observable surfaces in the environment. In particular embodiments, the mesh may be initialized to be equal-distance (e.g., 1, 2, 2.5, or 3 meters) from a viewer or camera. Since the 3D mesh is equal-distance away from the viewer, it forms a hemisphere around the user. The 3D mesh may be deformed according to the depth measurements of the observed physical objects in order to model the contour of the environment. In particular embodiments, the 3D mesh may be deformed based on the viewer's position and a point-cloud representation of the depth measurements. To determine which portion of the 3D mesh corresponds to each point in the point cloud, the computing device may cast a conceptual ray from the viewer's position towards that point. Each ray would intersect with a primitive (e.g., a triangle or other polygon) of the 3D mesh. As a result, the point of intersection on the mesh is deformed based on the depth value associated with the point through which the ray was cast. For example, if the depth measurement of the point is 2.2 meters away from the viewer, the initial 2-meter depth value associated with the point of intersection on the mesh may be changed to 2.2 meters. Once this process has been completed for each point in the point cloud, the resulting deformed mesh would represent the contour of the physical environment observed by the viewer, FIG. 5 provides an illustration of 3D-passthrough rendering based on a 3D model of the environment. In particular embodiments, the rendering system may determine the user's 102 current viewing position relative to the environment. In particular embodiments, the system may compute the pose of the HMD 104 using SLAM or other suitable techniques. Based on the known mechanical structure of the HMD 104, the system could then estimate the viewpoints of the user's eyes 500A and 500B using offsets from the pose of the HMD 104. The system may then render a passthrough image for each of the user's eyes 500A-B. For example, to render a passthrough image for the user's right eye 500A, the system may cast a ray 520 from the estimated viewpoint of the right eye 500A through each pixel of a virtual screen space 510A to see which portion of a 3D model would be intersected by the ray 520. This ray casting process may be referred to as a visibility test, as the objective is to determine what is visible from the selected viewpoint 500A. In the particular example shown, the ray 520 projected through a particular pixel 522 intersects with a particular point 521 on the 3D model 580. This indicates that the point of intersection 521 is to be displayed by the pixel 522. Once the point of intersection 521 is found, the rendering system may sample a corresponding point in a texture image that is mapped to the point of intersection 521. In particular embodiments, the image captured by the cameras 105A-B of the HMD 104 may be used to generate a texture for the 3D model 580. Doing so allows the rendered image to appear more like the actual physical object. In a similar manner, the rendering system may render a passthrough image for the user's left eye 500B. In the example shown, a ray 530 may be cast from the left-eye viewpoint 500B through pixel 532 of the left screen space 510B. The ray 530 intersects the 3D model 590 at location 531. The rendering system may then sample a texture image at a texture location corresponding to the location 531 on the model 590 and compute the appropriate color to be displayed by pixel 532. Since the passthrough images are re-rendered from the user's viewpoints 500A-B, the images would appear natural and provide proper parallax effect.

In particular embodiments, the passthrough images of the physical environment generated using the above process may be displayed to the user without further post-processing. However, it may be desirable in certain embodiments to minimize the visual representation of the physical environment to make the passthrough feature less intrusive to the ongoing virtual-reality experience. Thus, in particular embodiments, a gradient filter may be applied to the rendered passthrough images. In particular embodiments, the gradient filter visualizes changes in color or intensity between neighboring pixels. Thus, the gradient would typically highlight the edges or features of objects depicted in images. The gradient of the images results in a line-based outline of the objects. The line-based visualization approach reduces the amount of the screen that would need to be colored, which means that a higher percentage of what the user sees would be virtual-reality content. Another benefit of using the gradient is that it would not favor any particular color (e.g., darker colors would not be emphasized more over lighter colors), since the gradient identifies contrasts.

In particular embodiments, the outline of physical objects may be displayed with a uniform color tint to help contrast the passthrough information from virtual-reality content. The particular color tint of the passthrough feature may be selectable by the user. The color tint may also be selected by the application whose virtual-reality content is being displayed. This flexibility allows an application to select a color tint that would sufficiently contrast the general color scheme of the virtual content being provided. For example, if a game has a level that takes place in a fiery environment (e.g., in a volcano), the game may request the passthrough feature to be displayed in blue. When the user advances to the next level that takes place in a world of ice, the game may request the passthrough feature to be displayed in red.

Figure 6:
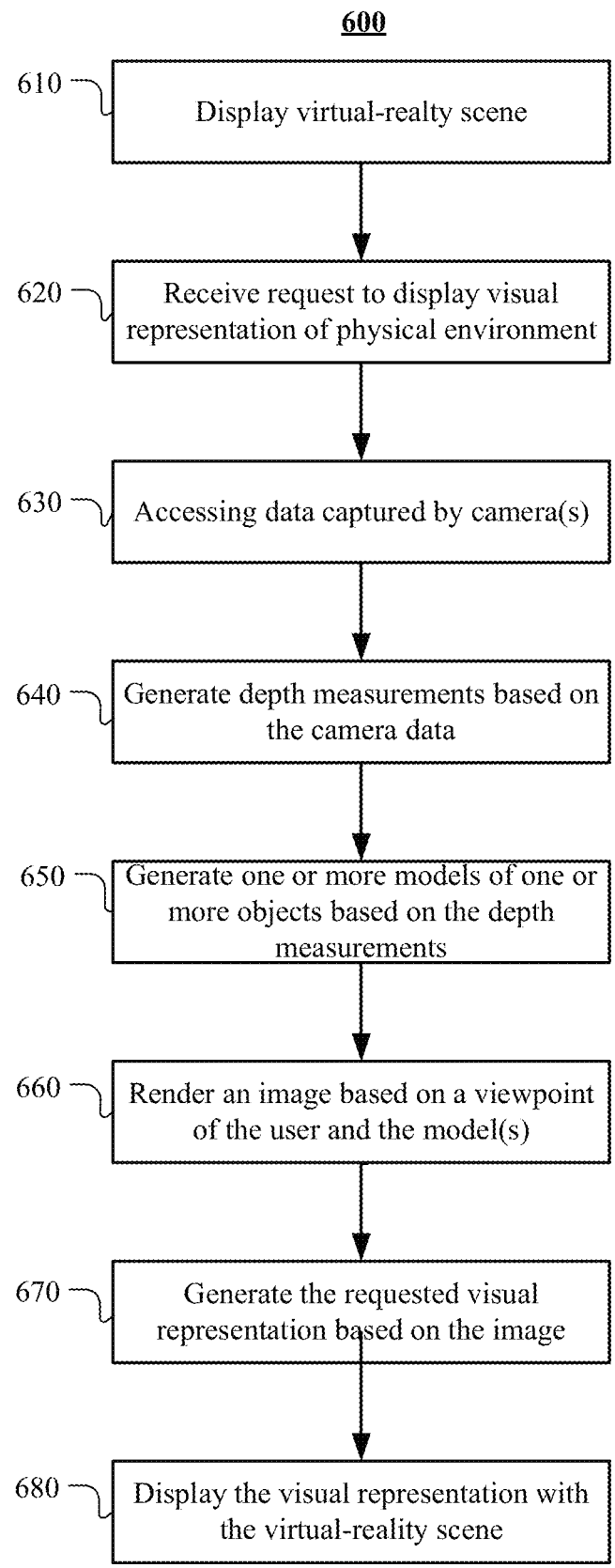
FIG. 6 illustrates an example method for providing a passthrough feature, in accordance with particular embodiments.

FIG. 6 illustrates an example method 600 for providing a passthrough feature. The method may begin at step 610, where a computing system associated with an artificial reality device may display a virtual-reality scene on a device worn by a user. The device worn by the user may be a head-mounted device that blocks the user from seeing the physical environment directly.

At step 620, the system may receive a request from the user to display a visual representation of at least a portion of a physical environment surrounding the user. The user may issue the request by pressing a button or a pattern of buttons, saying a particular verbal command, or making a particular gesture that is predetermined to trigger the passthrough feature.

At step 630, the system may access data associated with the physical environment captured by one or more cameras of the device. The data, for example, may be one or more images captured by the one or more cameras. In particular embodiments, the data may be a pair of stereo images that are captured simultaneously. In other embodiments, the data may be a single image that captures the physical environment while a structured light pattern is projected onto the objects in the environment. The structured light pattern may be emitted by the user's HMD. The light emitter's relative position to the camera may be known.

At step 640, the system may generate depth measurements of one or more objects (e.g., people, pets, chairs, toys, furniture, etc.) in the physical environment based on the accessed data. If the data is a pair of stereo images, the depth measurement may be computed using triangulation techniques based on pixel correspondences found between the pair of images. If the data is a single image of the environment with a structured light pattern, the depth measurements may be computed based on triangulation techniques based on the observed structured light pattern and the known relative spatial positions of the camera and the light emitter of the structured light pattern.

At step 650, the system may generate, based on the depth measurements, one or more models of the one or more objects in the physical environment. As previously described, the one or more models may include a mesh for each observed object in the environment. Alternatively, the system may use a single mesh that represents a contour of all objects in the environment.

At step 660, the system may render an image based on a viewpoint of the user and the one or more models. In particular embodiments, the viewpoint of the user corresponds to a first eye of the user.

At step 670, the system may generate, based on the image, the visual representation requested by the user. In particular embodiments, the visual representation is an outline of the one or more objects in the physical environment. The outline may be generated by applying a gradient filter to the rendered image. In particular embodiments, the outline may have a uniform color tint. In particular embodiments, the uniform color tint may be selected by the same application that is generating the virtual-reality scene. In particular embodiments, the virtual representation may be generated by an operating system of the computing system.

At step 680, the system may display the visual representation with the virtual-reality scene to the user. In particular embodiments, the visual representation may be an outline of the one or more objects superimposed over the virtual-reality scene. In embodiments where the viewpoint of the user corresponds to a first eye of the user (e.g., his right eye), the virtual representation and the virtual-reality scene may be displayed on a first display of the device configured to be viewed by the first eye of the user. The system may further generate a second virtual representation for the other eye of the user. If so, the system may determine a second viewpoint of a second eye of the user, render a second image based on the second viewpoint of the user and the one or more models of the objects, and generate a second visual representation of at least a portion of the physical environment surrounding the user. The system may then display the second visual representation with a second virtual-reality scene on a second display of the device configured to be viewed by the second eye of the user.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating 3D passthrough, including the particular steps of the method of FIG. 6, this disclosure contemplates any suitable method for generating 3D passthrough, including any suitable steps, which may include a subset of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
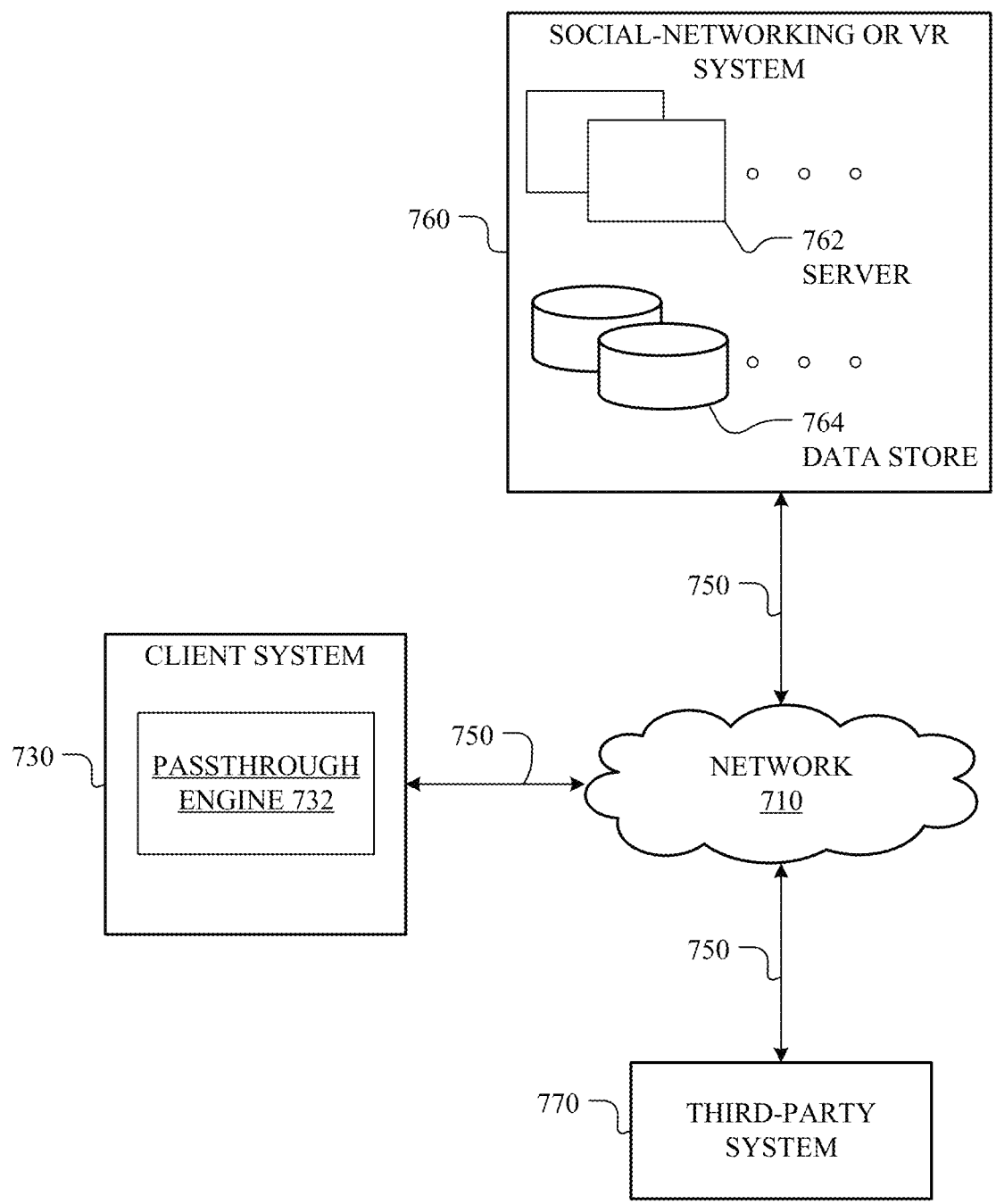
FIG. 7 illustrates an example network environment associated with a VR or social-networking system.

FIG. 7 illustrates an example network environment 700 associated with a VR or social-networking system. Network environment 700 includes a client system 730, a VR or social-networking system 760, and a third-party system 770 connected to each other by a network 710. Although FIG. 7 illustrates a particular arrangement of client system 730, VR or social-networking system 760, third-party system 770, and network 710, this disclosure contemplates any suitable arrangement of client system 730, VR or social-networking system 760, third-party system 770, and network 710. As an example and not by way of limitation, two or more of client system 730, VR or social-networking system 760, and third-party system 770 may be connected to each other directly, bypassing network 710. As another example, two or more of client system 730, VR or social-networking system 760, and third-party system 770 may be physically or logically co-located with each other in whole or in part. Moreover, although FIG. 7 illustrates a particular number of client systems 730, VR or social-networking systems 760, third-party systems 770, and networks 710, this disclosure contemplates any suitable number of client systems 730, VR or social-networking systems 760, third-party systems 770, and networks 710. As an example and not by way of limitation, network environment 700 may include multiple client system 730, VR or social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 (e.g., an HMD) may include a passthrough engine 732 to provide the passthrough feature described herein, and may have one or more add-ons, plug-ins, or other extensions. A user at client system 730 may connect to a particular server (such as server 762, or a server associated with a third-party system 770). The server may accept the request and communicate with the client system 730.

In particular embodiments, VR or social-networking system 760 may be a network-addressable computing system that can host an online Virtual Reality environment or social network. VR or social-networking system 760 may generate, store, receive, and send social-networking data, such as, for example, user-profile data, concept-profile data, social-graph information, or other suitable data related to the online social network. Social-networking or VR system 760 may be accessed by the other components of network environment 700 either directly or via network 710. As an example and not by way of limitation, client system 730 may access social-networking or VR system 760 using a web browser, or a native application associated with social-networking or VR system 760 (e.g., a mobile social-networking application, a messaging application, another suitable application, or any combination thereof) either directly or via network 710. In particular embodiments, social-networking or VR system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking or VR system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking or VR system 760, or a third-party system 770 to manage, retrieve, modify, add, or delete, the information stored in data store 764.

In particular embodiments, social-networking or VR system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking or VR system 760 may provide users of the online social network the ability to communicate and interact with other users. In particular embodiments, users may join the online social network via social-networking or VR system 760 and then add connections (e.g., relationships) to a number of other users of social-networking or VR system 760 to whom they want to be connected. Herein, the term "friend" may refer to any other user of social-networking or VR system 760 with whom a user has formed a connection, association, or relationship via social-networking or VR system 760.

In particular embodiments, social-networking or VR system 760 may provide users with the ability to take actions on various types of items or objects, supported by social-networking or VR system 760. As an example and not by way of limitation, the items and objects may include groups or social networks to which users of social-networking or VR system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or VR system 760 or by an external system of third-party system 770, which is separate from social-networking or VR system 760 and coupled to social-networking or VR system 760 via a network 710.

In particular embodiments, social-networking or VR system 760 may be capable of linking a variety of entities. As an example and not by way of limitation, social-networking or VR system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking or VR system 760. In particular embodiments, however, social-networking or VR system 760 and third-party systems 770 may operate in conjunction with each other to provide social-networking services to users of social-networking or VR system 760 or third-party systems 770. In this sense, social-networking or VR system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or VR system 760 also includes user-generated content objects, which may enhance a user's interactions with social-networking or VR system 760. User-generated content may include anything a user can add, upload, send, or "post" to social-networking or VR system 760. As an example and not by way of limitation, a user communicates posts to social-networking or VR system 760 from a client system 730. Posts may include data such as status updates or other textual data, location information, photos, videos, links, music or other similar data or media. Content may also be added to social-networking or VR system 760 by a third-party through a "communication channel," such as a newsfeed or stream.

In particular embodiments, social-networking or VR system 760 may include a variety of servers, sub-systems, programs, modules, logs, and data stores. In particular embodiments, social-networking or VR system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or VR system 760 may also include suitable components such as network interfaces, security mechanisms, load balancers, failover servers, management-and-network-operations consoles, other suitable components, or any suitable combination thereof. In particular embodiments, social-networking or VR system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or VR system 760 to one or more client systems 730 or one or more third-party system 770 via network 710. The web server may include a mail server or other messaging functionality for receiving and routing messages between social-networking or VR system 760 and one or more client systems 730. An API-request server may allow a third-party system 770 to access information from social-networking or VR system 760 by calling one or more APIs. An action logger may be used to receive communications from a web server about a user's actions on or off social-networking or VR system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking or VR system 760. A privacy setting of a user determines how particular information associated with a user can be shared. The authorization server may allow users to opt in to or opt out of having their actions logged by social-networking or VR system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
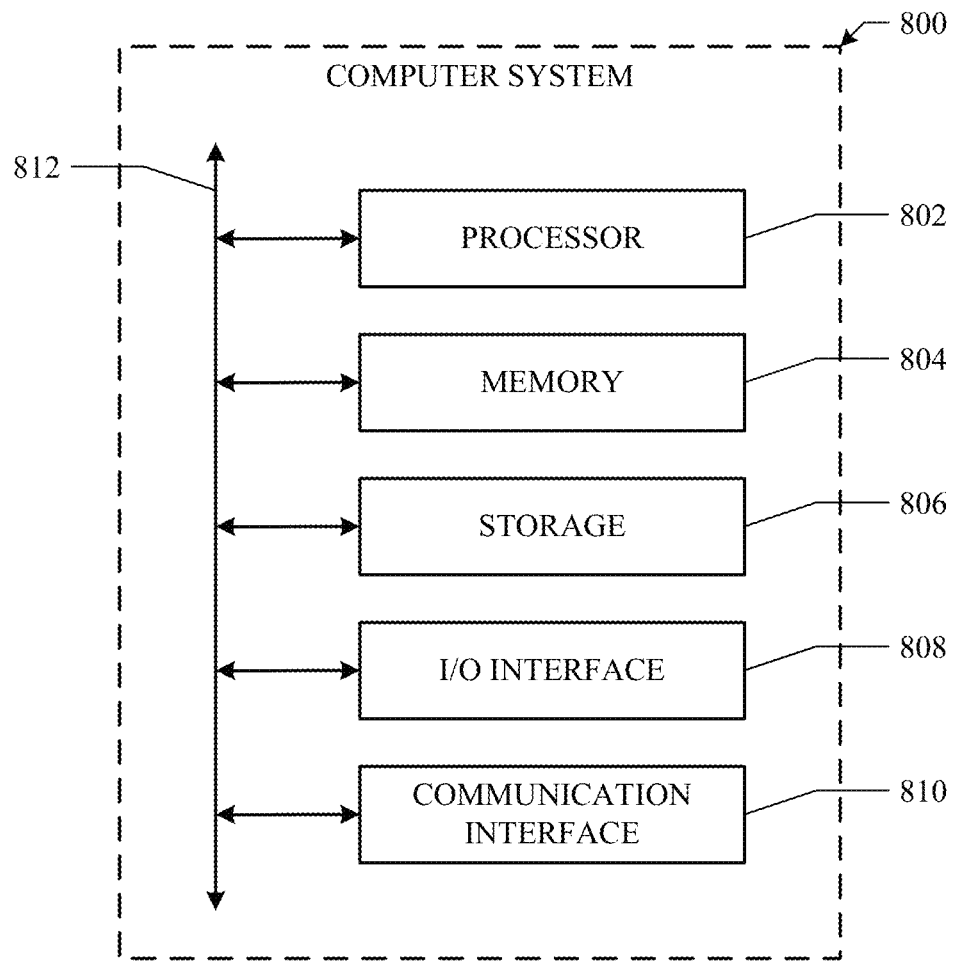
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   displaying a virtual-reality scene on a device worn by a user;
   receiving a request from the user to display a visual representation of at least a portion of a physical environment surrounding the user;
   accessing data associated with the physical environment captured by one or more cameras of the device;
   generating, based on the data, depth measurements of one or more objects in the physical environment;
   generating, based on the depth measurements, one or more three-dimensional (3D) models of the one or more objects in the physical environment;
   rendering an output image based on a current viewpoint of an eye of the user and the one or more 3D models of the one or more objects in the physical environment;
   generating, based on the output image, the visual representation requested by the user; and
   displaying the visual representation with the virtual-reality scene to the user.

2. The method of claim 1, wherein the visual representation is an outline of the one or more objects in the physical environment.

3. The method of claim 2, wherein the displayed outline of the one or more objects is superimposed over the virtual-reality scene.

4. The method of claim 2, wherein the displayed outline has a uniform color tint.

5. The method of claim 4, wherein the virtual-reality scene is generated by an application and the uniform color tint is selected by the application.

6. The method of claim 1, wherein generating the visual representation comprises applying a gradient filter to the output image.

7. The method of claim 1, wherein the visual representation is generated by an operating system of the computing system.

8. The method of claim 1, wherein the device worn by the user is a head-mounted device that blocks the user from seeing the physical environment directly.

9. The method of claim 1, wherein:
the current viewpoint of the eye of the user corresponds to a first eye of the user; and
the visual representation and the virtual-reality scene are displayed on a first display of the device configured to be viewed by the first eye of the user.

10. The method of claim 9, further comprising:
determining a second viewpoint of a second eye of the user;
rendering a second output image based on the second viewpoint of the user and the one or more 3D models of the objects;
generating a second visual representation of at least a portion of the physical environment surrounding the user; and
displaying the second visual representation with a second virtual-reality scene on a second display of the device configured to be viewed by the second eye of the user.

11. One or more computer-readable non-transitory storage media embodying software that is operable when executed to:
display a virtual-reality scene on a device worn by a user;
receive a request from the user to display a visual representation of at least a portion of a physical environment surrounding the user;
access data associated with the physical environment captured by one or more cameras of the device;
generate, based on the data, depth measurements of one or more objects in the physical environment;
generate, based on the depth measurements, one or more three-dimensional (3D) models of the one or more objects in the physical environment;
render an output image based on a current viewpoint of an eye of the user and the one or more 3D models of the one or more objects in the physical environment;
generate, based on the output image, the visual representation requested by the user; and
display the visual representation with the virtual-reality scene to the user.

12. The media of claim 11, wherein the visual representation is an outline of the one or more objects in the physical environment.

13. The media of claim 12, wherein the displayed outline of the one or more objects is superimposed over the virtual-reality scene.

14. The media of claim 12, wherein the displayed outline has a uniform color tint.

15. The media of claim 14, wherein the virtual-reality scene is generated by an application and the uniform color tint is selected by the application.

16. A system comprising:
one or more processors; and
one or more computer-readable non-transitory storage media coupled to one or more of the processors and comprising instructions operable when executed by one or more of the processors to cause the system to:
display a virtual-reality scene on a device worn by a user;
receive a request from the user to display a visual representation of at least a portion of a physical environment surrounding the user;
access data associated with the physical environment captured by one or more cameras of the device;
generate, based on the data, depth measurements of one or more objects in the physical environment;
generate, based on the depth measurements, one or more three-dimensional (3D) models of the one or more objects in the physical environment;
render an output image based on a current viewpoint of an eye of the user and the one or more 3D models of the one or more objects in the physical environment;
generate, based on the output image, the visual representation requested by the user; and
display the visual representation with the virtual-reality scene to the user.

17. The system of claim 16, wherein the visual representation is an outline of the one or more objects in the physical environment.

18. The system of claim 17, wherein the displayed outline of the one or more objects is superimposed over the virtual-reality scene.

19. The system of claim 17, wherein the displayed outline has a uniform color tint.

20. The system of claim 19, wherein the virtual-reality scene is generated by an application and the uniform color tint is selected by the application.

* * * * *